Dec. 29, 1964  M. I. ARVIDSSON  3,163,288
PACKAGE
Filed Feb. 5, 1963

INVENTOR

MAURITZ INGEMAR ARVIDSSON

BY
ATTORNEY

United States Patent Office 3,163,288
Patented Dec. 29, 1964

3,163,288
PACKAGE
Mauritz Ingemar Arvidsson, Goteborg, Sweden, assignor to Aktiebolaget Astra, Apotekarnes Kemiska Fabriker, Sodertalje, Sweden, a company of Sweden
Filed Feb. 5, 1963, Ser. No. 256,464
Claims priority, application Sweden Feb. 9, 1962
1 Claim. (Cl. 206—63.3)

The present invention relates to a package of the type consisting of a double heat sealable plastic foil, the two walls of which are attached to each other by welding seams which define a closed package space. Particularly, the invention relates to a package for surgical sutures and especially to a package, which contains a relatively short suture thread intended for use only once.

A package of this type is disclosed, for example, in U.S. Patent No. 2,949,181, where the suture thread lies in an inner plastic bag, which is placed in an outer package. An inconvenience with packages of this type is that the contents, i.e. the suture, easily falls out when the package is opened. The present invention is directed to remedying this inconvenience by providing a package which is formed so that it can be opened only partly, the contents being able to remain in the partly opened package.

The package according to the invention is characterized in that the welding seams consist of two regions, namely a first region which is made relatively weak, so as to provide a small resistance against breaking of the seam when the two walls of the package are drawn apart, and a second region which is made relatively strong so as to provide considerable resistance against tearing apart and which is positioned so that the package is opened only partly when said first region of the welding seams is torn apart.

The invention will now be further described with reference to FIGURES 1 and 2 of the accompanying drawing, which illustrate two embodiments of the package according to the invention.

Figure 1:
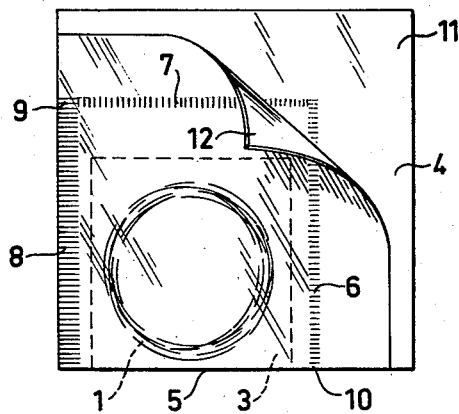

In FIG. 1 a coil of a sterile suture thread is placed in a plastic bag 3, which is placed in a double folded plastic foil 4 folded along the folding edge 5. A closed space is created around the plastic bag 3 by welding together the two layers of plastic foil by three welding seams, namely two welding seams 6 and 7 which are easily torn apart and a welding seam 8 which provides a considerable resistance against tearing apart.

When opening the package, the flaps 11 and 12 are drawn apart, the welding seams 6 and 7 being easily torn apart up to the points 9 and 10. About half of the plastic bag 3 then projects from the half-opened package and can easily be removed therefrom.

For the sake of simplicity the welding seam 8 is in its entirety made so strong that it provides a considerable resistance against tearing apart. Alternatively, it can be made weaker, and a reinforcement, e.g. an extra spot weld, provided at the point 9 which stops the tearing apart of the welding seam 7 at this point.

Figure 2:
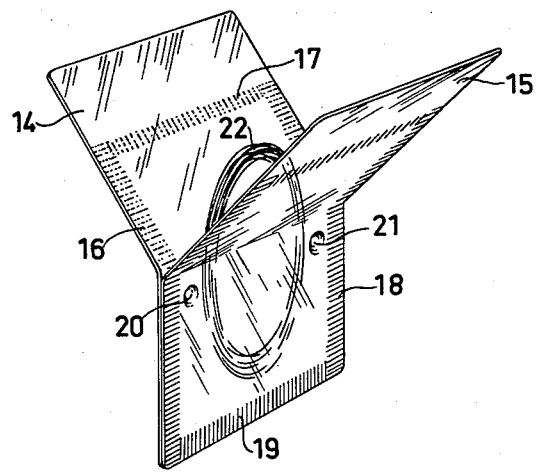

The package illustrated in FIG. 2 consists of two plastic foils 14 and 15, which are welded together by four welding seams 16–19. The closed space thus obtained contains a suture thread 22. Adjacent the middle portion of the welding seams 16, 18 there are provided two spot welds 20 and 21, which are comparatively difficult to tear apart. The package can easily be torn apart to the stage shown in FIG. 2, i.e. to the spot welds, whereupon the suture thread can be withdrawn. The spot welds 20, 21 can be made at the same time as the welding seams 16–19 or in a separate operation. In the latter case the spot welds can be placed on the welding seams 16, 18.

The sealing of the package can be performed in a known manner by a heated tool which is pressed against the foil. The strength of the welding seams can be controlled in a known manner by varying the temperature of the tool or the pressure and the time under which the two foils are pressed against each other by the tool. Another way of increasing the strength of the welding seams is, as shown in FIG. 1, to increase the breadth of the welding seam having the greater resistance to breaking apart, or, as shown in FIG. 2, to apply extra spot welds at the places where the tearing apart of the package walls is to be stopped.

The package according to the invention may also be used for pulverulent and liquid materials. In these cases it is suitable to fill the package only with such a quantity of material which can be contained in the part of the package not to be opened when the seal is torn apart. The technique of filling a package of this type with pulverulent and liquid materials is known in the art and will not be further described here.

I claim:

A package comprising a rectangular web of thermoplastic material having short ends and substantially longer sides and folded along a fold line parallel to said short ends to form package walls, a heat seal formed along one of said longer sides of the web and connecting said walls, said first seal extending from the fold line to a first point spaced a substantial distance from the ends of said web, a second heat seal formed between and connecting said walls and extending parallel to said first seal from the fold line to a second point located at the same distance from the web ends as said first point, said second seal being spaced a substantial distance from the other of said longer sides of said web, a third heat seal extending from said first point to said second point and parallel to the fold line of said web, and a reinforcing spot heat seal in the region of said first point providing considerable resistance against tearing apart of the walls, whereby the package may be partially opened to the extent that the first heat seal and the fold line remain intact and a triangular portion defined by a diagonal line across said package walls from said first point to the intersection of said second seal and the fold line provides a receptacle retaining an object therein after the package has been partially opened.

References Cited in the file of this patent
UNITED STATES PATENTS

| | | |
|---|---|---|
| 2,648,463 | Scherer | Aug. 11, 1953 |
| 2,949,181 | Buccino | Aug. 16, 1960 |
| 2,998,880 | Ladd | Sept. 5, 1961 |